(12) United States Patent
Lim et al.

(10) Patent No.: US 12,434,582 B2
(45) Date of Patent: Oct. 7, 2025

(54) POWER CONVERTING SYSTEM FOR VEHICLE AND CONTROL METHOD THEREOF

(71) Applicant: HYUNDAI AUTOEVER CORP., Seoul (KR)

(72) Inventors: Dong-Hwi Lim, Yongin-si (KR); Woo-Won Rhee, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 993 days.

(21) Appl. No.: 17/531,517

(22) Filed: Nov. 19, 2021

(65) Prior Publication Data

US 2022/0185130 A1    Jun. 16, 2022

(30) Foreign Application Priority Data

Dec. 14, 2020  (KR) .......................... 10-2020-0174601

(51) Int. Cl.
*B60L 53/22*    (2019.01)
*H02M 1/00*    (2006.01)
(Continued)

(52) U.S. Cl.
CPC ........... *B60L 53/22* (2019.02); *H02M 1/0012* (2021.05); *H02M 1/4208* (2013.01); *H03K 7/08* (2013.01); *B60L 2210/10* (2013.01)

(58) Field of Classification Search
CPC .......... B60L 53/20; B60L 53/22; B60L 58/20; H02M 1/007; H02M 1/0012;
(Continued)

(56) References Cited

U.S. PATENT DOCUMENTS

| 6,486,809 B1 | 11/2002 | Figoli |
| 10,454,365 B2 | 10/2019 | Lim et al. |

(Continued)

FOREIGN PATENT DOCUMENTS

| CN | 102332815 A | 1/2012 |
| CN | 207156960 U | 3/2018 |

(Continued)

OTHER PUBLICATIONS

Office Action cited in corresponding Korean patent application No. KR10-2020-0174601; Jun. 2, 2022; 8 pp.

(Continued)

*Primary Examiner* — Julian D Huffman
*Assistant Examiner* — Johali A Torres Ruiz
(74) *Attorney, Agent, or Firm* — Lempia Summerfield Katz LLC

(57) ABSTRACT

A power converting system for a vehicle may include: a high-capacity on board charger (OBC) configured to charge a high-capacity high-voltage battery. a low voltage DC-DC converter (LDC) configured to convert a high voltage of the high-capacity high-voltage battery into a low voltage and charge a low voltage battery. The power converting system may further include an OBC and LDC integrated controller configured to perform integrated control of the high-capacity OBC and the LDC. The OBC and LDC integrated controller performs pulse width modulation (PWM) switching control by synchronizing ADC operation and PWM switching frequency control operation.

20 Claims, 6 Drawing Sheets

(51) Int. Cl.
  *H02M 1/42* (2007.01)
  *H03K 7/08* (2006.01)
(58) Field of Classification Search
  CPC .... H02M 1/4208; H02M 1/4233; H02M 3/01;
   H02M 3/157; H02M 3/285; H02M
   3/33507; Y02T 10/70; Y02T 10/7072;
   Y02T 90/14; H02J 7/007; H02J 2207/20
  See application file for complete search history.

(56) References Cited

U.S. PATENT DOCUMENTS

| | | | |
|---|---|---|---|
| 11,139,657 | B2 | 10/2021 | Nakajima et al. |
| 2018/0166978 | A1* | 6/2018 | Lim ........................ H02M 7/06 |
| 2018/0287390 | A1 | 10/2018 | Nakajima et al. |
| 2019/0168632 | A1* | 6/2019 | Deng ....................... B60L 50/64 |
| 2019/0184838 | A1* | 6/2019 | Lee .......................... B60L 53/24 |
| 2020/0119649 | A1* | 4/2020 | Uno ........................ H02J 7/0024 |
| 2020/0321880 | A1* | 10/2020 | Lee ............................. H02J 3/32 |
| 2020/0403510 | A1* | 12/2020 | Nonaka .................... H02M 1/36 |
| 2021/0165758 | A1* | 6/2021 | Song ................. G06F 15/17331 |

FOREIGN PATENT DOCUMENTS

| | | |
|---|---|---|
| CN | 108233696 A | 6/2018 |
| JP | 2017153322 A | 8/2017 |
| JP | 6558254 B2 | 8/2019 |
| KR | 101866095 B1 | 6/2018 |
| KR | 101991131 B1 | 6/2019 |
| KR | 20190118085 A | 10/2019 |
| KR | 20200080350 A | 7/2020 |
| KR | 20200083871 A | 7/2020 |
| KR | 20200102836 A | 9/2020 |
| WO | 2020038708 A1 | 2/2020 |

OTHER PUBLICATIONS

Office Action cited in Chinese patent application No. 202111361918. 5; Apr. 6, 2023; 14 pp.

* cited by examiner

POWER CONVERTING SYSTEM FOR VEHICLE AND CONTROL METHOD THEREOF

CROSS-REFERENCE TO RELATED APPLICATION

This application claims priority to and the benefit of Korean Patent Application No. 10-2020-0174601, filed on Dec. 14, 2020, the entire contents of which are herein incorporated by reference.

FIELD

The present disclosure relate to a power converting system for a vehicle and a control method thereof, and more particularly, to a power converting system for a vehicle, which can control a high-capacity OBC (On Board Charger) and an LDC (Low voltage DC-DC Converter), which are included therein, through one integrated controller, and a control method thereof.

BACKGROUND

The statements in this section merely provide background information related to the present disclosure and may not constitute prior art.

Recently, as environmental issues such as global warning and environmental pollution have come to the fore, research and development are being actively conducted on eco-friendly vehicles capable of reducing environmental pollution as a result of vehicle usage. The market for the eco-friendly vehicles is increasing.

As such eco-friendly vehicles (electric vehicles, hybrid vehicles, plug-in hybrid vehicles, and/or other green vehicles), which use an electric motor for generating driving power, are being launched in markets throughout the world. Electric vehicles and plug-in hybrid vehicles receive power from an external charging system, often connected to a grid, to charge an installed battery. The battery is used to produce kinetic energy required for driving the vehicle.

Thus, the eco-friendly vehicles include an on-board charger (OBC) which receives grid power from the external charging system and converts the grid power into DC power for charging the battery.

The OBC may apply the DC power, obtained by converting the AC grid power, to the high-voltage battery within the vehicle in order to charge the high-voltage battery. The high-voltage battery may have a terminal connected to a high-voltage load such as an air conditioning system in the vehicle and an LDC (Low voltage DC-DC Converter) for converting a high voltage into a low voltage.

The LDC down-converts the voltage of the high voltage battery, in order to generate a supply voltage to an electric field load which operates at a low voltage (e.g., about 12 V), or to generate a voltage for charging a low-voltage battery.

The conventional OBC includes a PFC (Power Factor Corrector) between a rectifier circuit for converting AC grid power into DC power and a DC-DC converting circuit (e.g. DC-DC converter or LLC converter).

Furthermore, controllers (e.g., OBC controller and LDC controller) for controlling the OBC and the LDC, respectively, are separately installed.

Recently, in order to increase the range of electric vehicles and the like, the capacity and output voltage of the high-voltage battery have been increased. In order to cope with the recent trend, the OBC includes multiple DC-DC converting circuits (e.g., DC-DC converters or LLC converters). Specifically, the DC-DC converters or 2-stack LLC converters may be connected in parallel. Therefore, an optimized new controller is required to control a high-capacity OBC. In other words, there is demand for an OBC for charging a high-voltage battery whose capacity and output voltage are increased.

The controller includes a driver for switching internal switches of the PFC, the DC-DC converter and the LDC converter through the PWM method and a control unit (e.g., microcontroller, CPU, or other processing device) for controlling the driver.

Furthermore, to reduce the entire volume and cost of a power converting systems used for charging a vehicle, there is a need for a new controller which integrates the controllers (e.g. OBC controller and LDC controller) which have been separate in previous systems.

SUMMARY

Various embodiments of the present disclosure are directed to a power converting system for a vehicle, which can control a high-capacity OBC (On Board Charger) and an LDC (Low voltage DC-DC Converter), which are included therein, through one integrated controller, and a control method thereof.

In various embodiments of the present disclosure, a power converting system for a vehicle may include: a high-capacity OBC configured to charge a high-capacity high-voltage battery whose capacity is increased to a reference capacity or more. The power converting system may further include an LDC configured to convert a high voltage of the high-capacity high-voltage battery into a low voltage and charge a low voltage battery. The power converting system may further include an OBC and LDC integrated controller configured to perform integrated control on the high-capacity OBC and the LDC. The OBC and LDC integrated controller performs PWM (Pulse Width Modulation) switching control by synchronizing an ADC operation and a PWM switching frequency control operation.

The high-capacity OBC may include a plurality of DC-DC converting circuits connected in parallel.

The OBC and LDC integrated controller may include: a driver configured to perform control through a PWM method. The driver may further perform control via internal switches of a PFC (Power Factor Corrector) and the plurality of high-voltage DC-DC converters connected in parallel, which are included in the high-capacity OBC. The OBC and LDC integrated controller may further include internal switches of a low-voltage DC-DC converter included in the LDC. The OBC and LDC integrated controller may further include an ADC (Analog Digital Converter) module configured to convert a voltage value and a current value into digital values. The OBC and LDC integrated controller may further include a control unit configured to control the driver and the ADC module.

The control unit may include two or more cores.

When a first core of the OBC and LDC integrated controller is implemented to perform both on/off control of the ADC module and first control calculation and a second core of the OBC and LDC integrated controller is implemented to perform second control calculation, the first core may count a designated number of PWM switching periods to synchronize an ADC operation and a PWM switching frequency control operation. At this time, the integrated controller may perform an ADC operation when the next PWM switching period is started, At this time, the integrated controller may also perform the first control calculation after performing designated ADC operation control.

The first core may pause the count of PWM switching periods while performing the first control calculation. The first core may resume the count from the next PWM switching period after the first control calculation is completed. The first core may apply the result value of the first control calculation in the next PWM switching period after the designated number of PWM switching periods are completely counted.

The OBC and LDC integrated controller may further include a third core configured to perform on/off control of the ADC module and count PWM switching periods. When an ADC operation is started in a PWM switching period according to an ADC control period, the third core may stop the ADC operation after one ADC operation is completed. The third core may simultaneously count a designated number of PWM switching periods. The count may occur regardless of whether or when the first and second control calculations are performed. The third core may also output a designated command when the count is completed. The third core may also apply the results of the first and second control calculations in the next PWM switching period. The third core may also resume the ADC operation.

In various embodiments of the present disclosure, a control method of a power converting system for a vehicle may include: checking, by an OBC and LDC integrated controller, the number of PWM switching periods. The method may further include starting, by the OBC and LDC integrated controller, an ADC operation when the check result indicates that the designated number of PWM switching periods are completed. The method may further include performing, by the OBC and LDC integrated controller, a designated control calculation on the basis of the ADC operation result. The method may further include applying the control calculation result value in the next PWM switching period.

The number of PWM switching periods may indicate a designated number of PWM switching periods, which are counted to synchronize the ADC operation and the PWM switching frequency control operation.

The control calculation may indicate calculating a PWM switching frequency and duty which are required to acquire a target output voltage/current according to an input voltage/current detected through the ADC operation.

The OBC and LDC integrated controller may include a driver configured to perform control through a PWM method. The driver may further perform control via internal switches of a PFC and a plurality of high-voltage DC-DC converters connected in parallel, which are included in a high-capacity OBC. The driver may further perform control via internal switches of a low-voltage DC-DC converter included in an LDC. The OBC and LDC integrated controller may further include an ADC module configured to convert a voltage value and a current value into digital values. The OBC and LDC integrated controller may include a control unit configured to control the driver and the ADC module.

The control unit may include two or more cores.

When a first core of the OBC and LDC integrated controller is implemented to perform on/off control of the ADC module and first control calculation and a second core of the OBC and LDC integrated controller is implemented to perform second control calculation, the first core may count a designated number of PWM switching periods to synchronize an ADC operation and a PWM switching frequency control operation. At that time, the first core may perform an ADC operation when the next PWM switching period is started. At that time, the first core may further perform the first control calculation after completely performing designated ADC operation control.

The first core may pause the count of the PWM switching periods while performing the first control calculation. The first core may resume the count from the next PWM switching period after the first control calculation is completed. The first core may further and apply the result value of the first control calculation in the next PWM switching period after the designated number of PWM switching periods are completely counted.

The OBC and LDC integrated controller may further include a third core configured to perform on/off control of the ADC module and count PWM switching periods. When an ADC operation is started in a PWM switching period according to an ADC control period, the third core may stop the ADC operation after one ADC operation is completed and simultaneously count a designated number of PWM switching periods regardless of whether to perform the first and second control calculations. The third core may further output a designated command when the count is completed. The third core may further apply the results of the first and second control calculations in the next PWM switching period. The third core may further resume the ADC operation.

In various embodiments, the high-capacity OBC and the LDC, which are included in the power converting system for a vehicle, may be controlled by one integrated controller. Thus, the high-capacity OBC (e.g., the OBC for charging a high-voltage battery whose capacity and output voltage are increased—in some cases beyond a defined reference capacity/voltage) may be controlled through a PWM method This may result in a reduction in vehicle power converter volume and cost.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
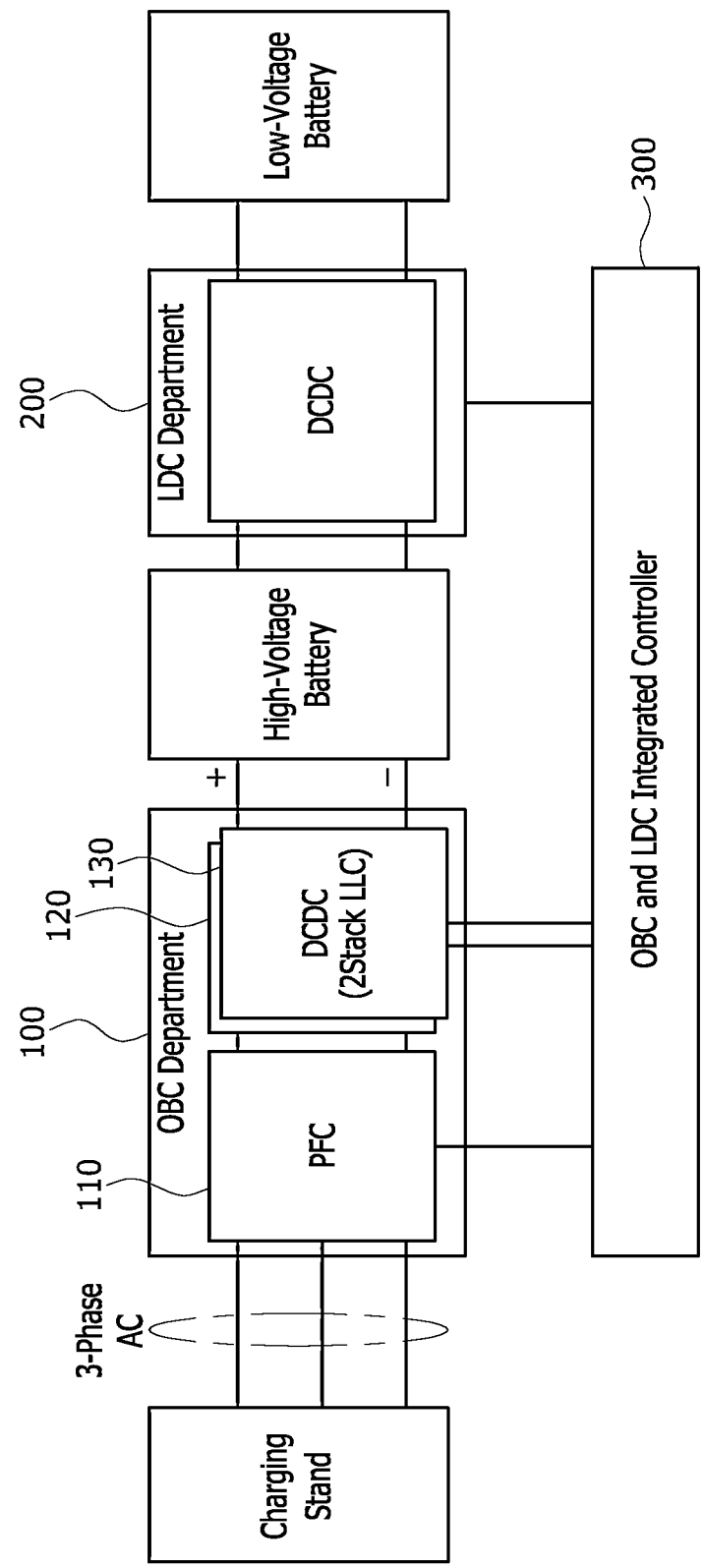
FIG. 1 is a schematic diagram illustrating an example power converting system for a vehicle.

The drawings described herein are for illustration purposes only and are not intended to limit the scope of the present disclosure in any way.

DETAILED DESCRIPTION OF THE ILLUSTRATED EMBODIMENTS

The following description is merely exemplary in nature and is not intended to limit the present disclosure, application, or uses. It should be understood that throughout the drawings, corresponding reference numerals indicate like or corresponding parts and features.

Hereinafter, a power converting system for a vehicle and a control method thereof are described below with reference to the accompanying drawings through various exemplary embodiments.

It should be noted that the drawings are not to precise scale and may be exaggerated in thickness of lines or sizes of components—for descriptive convenience and clarity only. Furthermore, the terms as used herein are defined by taking functions of various illustrative example implementations into account and can be changed according to the custom or intention of users or operators. Therefore, definition of the terms should be made according to the overall disclosure FIG. 1 is a schematic diagram illustrating an example power converting system for a vehicle in an embodiment of the present disclosure.

As illustrated in FIG. 1, the example power converting system for a vehicle includes a high-capacity OBC (On Board Charger) 100 configured to charge a high-capacity high-voltage battery whose capacity is increased to a designated reference capacity or more, an LDC (Low Voltage DC-DC Converter) 200 configured to convert a high voltage of the high-voltage battery into a low voltage to charge a low-voltage battery, and an OBC and LDC integrated controller 300 configured to perform integrated control on the high-capacity OBC 100 an the LDC 200.

The high-capacity OBC 100 may include an OBC which includes a plurality of DC-DC converting circuits (e.g., DC-DC converters or 2-stack LLC converters) connected in parallel, and can charge a high-capacity battery whose capacity is equal to or more than double the capacity of an existing low-capacity battery.

Thus, the OBC and LDC integrated controller 300 includes a driver, an analog digital converter (ADC) module and a control unit (e.g., a microcontroller, CPU, and/or other processing device), which are not illustrated. The driver serves to control, through a PWM method, internal switches of a PFC (Power Factor Corrector) 110 and a plurality of high-voltage DC-DC converters (DCDC1 and DCDC2) 120 and 130, which are included in the high-capacity OBC 100, and internal switches (e.g., MOSFET switches) of a low-voltage DC-DC converter (DCDC) included in the LDC 200. The ADC module serves to convert a voltage value and a current value into digital values. The control unit serves to control the driver and the ADC module.

In various implementations, the control unit (e.g., a microcontroller, CPU, or other processing device) include multiple cores (e.g., CORE0, CORE1, CORE2 and the like).

However, when the high-voltage battery is charged by the conventional power converting system for a vehicle according to the above-described recent trend in which the capacity and output voltage of the high-voltage battery are increased to improve the range of electric vehicles, the entire volume and weight of the vehicle may be increased, and the manufacturing cost of the vehicle may also be increased.

The power converting system for a vehicle, which is configured to charge a high-capacity battery even though the capacity of the battery is increased, may be reduced in size and/or improved with regard to performance.

For example, to reduce the size of the power converting system for a vehicle, the capacities of an inductor L and a capacitor C within a converter may be reduced. In order to reduce the capacities of the inductor L and the capacitor C within the converter, a PWM switching frequency for controlling an internal switch (e.g., MOSFET switch) (not illustrated) may be increased.

However, when the PWM switching frequency for controlling an internal switch of the converter is increase, an output voltage (or current) may incur reduced control precision if control calculation and PWM switching frequency control are not synchronized. In this case, control reliability and thermodynamic (e.g., temperature) characteristics may be degraded. The control calculation includes calculation of a PWM switching frequency and duty which are used to acquire a target output voltage/current according to an input voltage/current.

Figure 2:
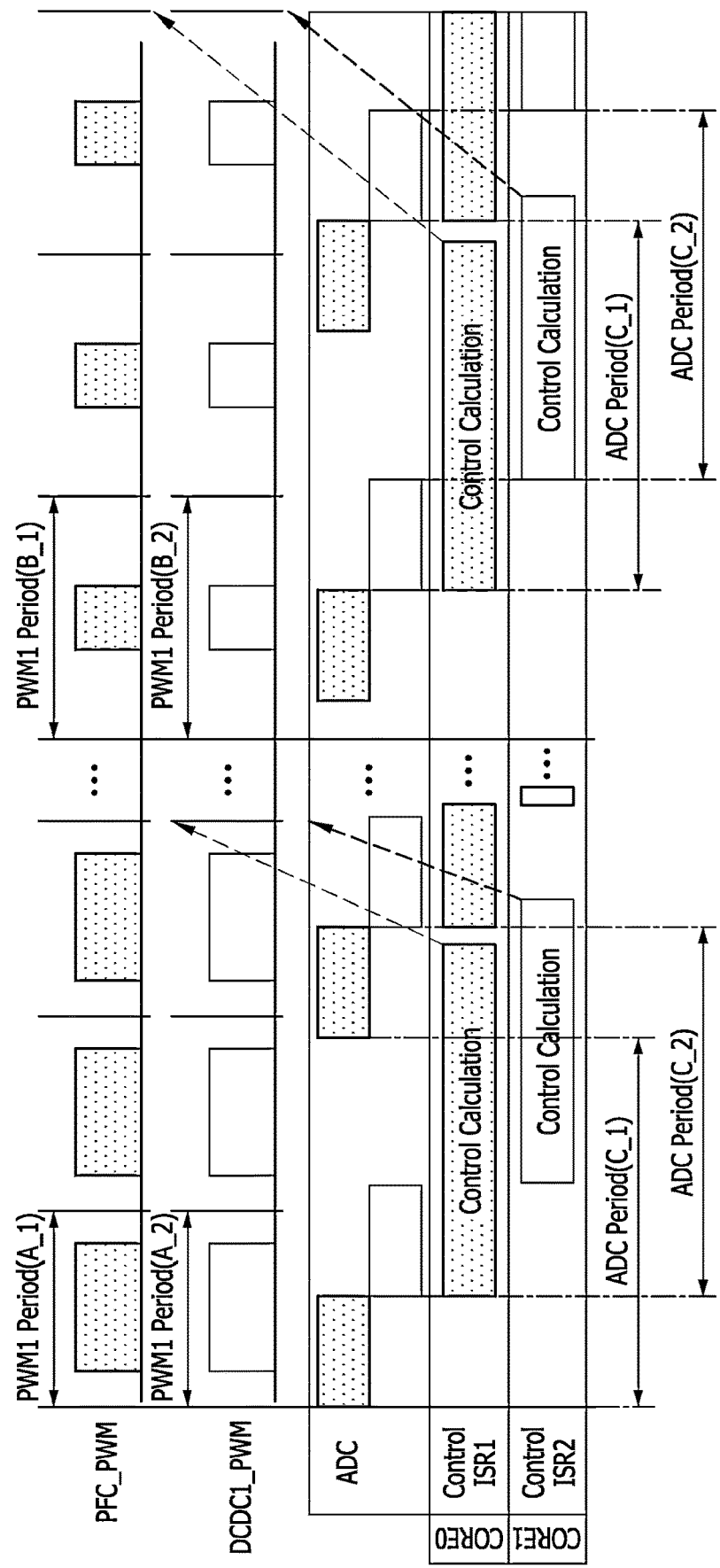
FIGS. 2 and 3 show a problem which occurs when a conventional method for controlling a PWM switching frequency is applied to the power converting system for a vehicle.
Figure 3:
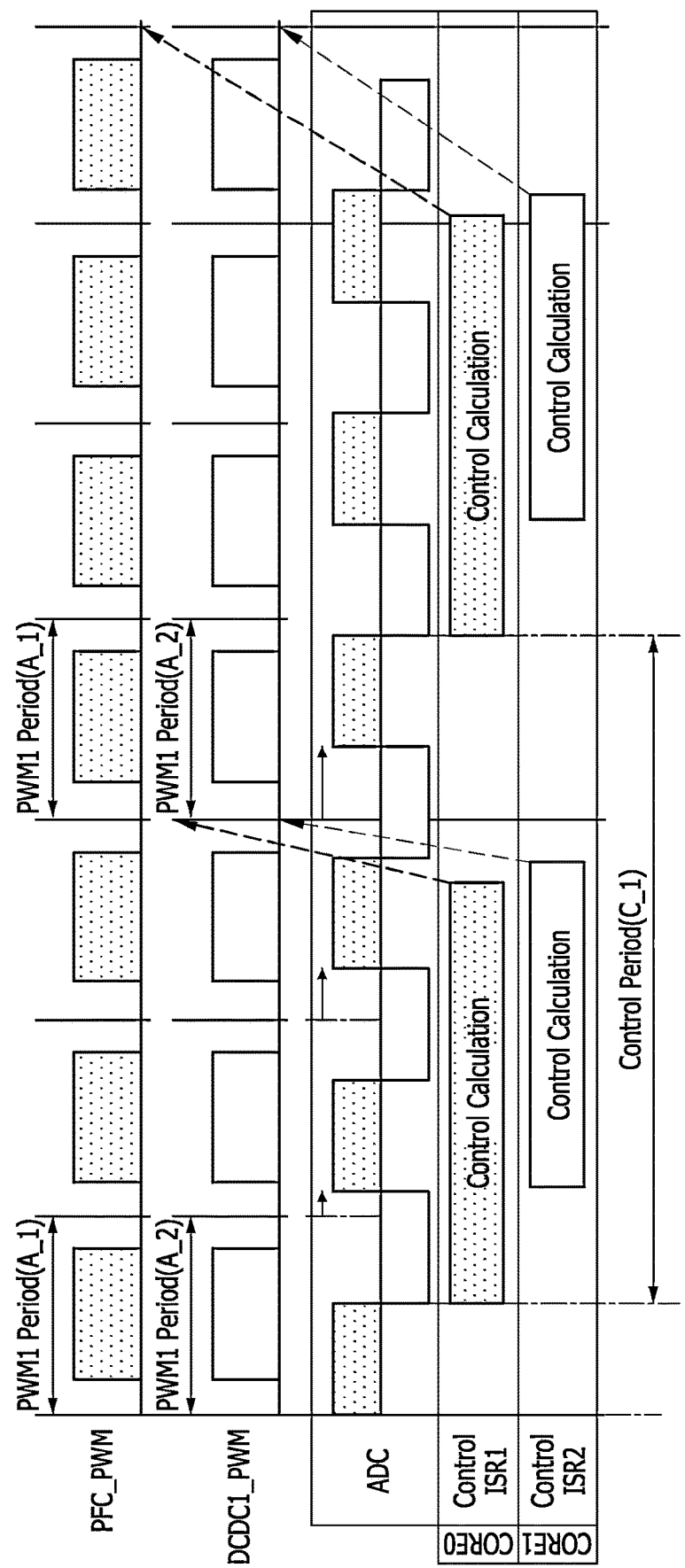

FIGS. 2 and 3 are diagrams for describing an example problem which occurs when a conventional method for controlling a PWM switching frequency is applied to an example power converting system for a vehicle.

For reference, the control of the PWM switching frequency may be actually applied to the PFC 110 and the high-voltage DC-DC converters (e.g., DCDC1 120 and DCDC2 130) of the high-capacity OBC 100 and the low voltage DC-DC converter (e.g., DCDC) of the LDC 200. For convenience of description, however, only the PFC 110 and the first high-voltage DC-DC converter (e.g., DCDC1 120) which is one of the high-voltage DC-DC converters (e.g., DCDC1 120 and DCDC2 130) are illustrated. In various implementations, the converters may operate at the same frequency (the same period). However, in various implementation the converters may operator at different frequencies.

Referring to FIG. 2, the ADC module (not illustrated) operates in an ADC period that is different than a PWM switching period. In the example of FIG. 2, the ADC module is not operative to perform multiple ADC operations at the same time. Thus, the ADC module first performs a first ADC operation on the PFC 110, and then perform a second ADC operation on the first high-voltage DC-DC converter DCDC1.

When it is the first core CORE0 of the OBC and LDC integrated controller 300 performs a first control calculation (control ISR1) and the second core CORE1 of the OBC and LDC integrated controller 300 performs a second control calculation (control ISR2), the first control calculation (control ISR1) is performed to calculate a PWM switching frequency to acquire a target output voltage/current according to an input voltage/current detected through the first ADC operation The second control calculation (control ISR2) is performed to calculate a PWM switching frequency to acquire a target output voltage/current according to an input voltage/current detected through the second ADC operation.

When the first control calculation (control ISR1) and the second control calculation (control ISR2) are completed, the OBC and LDC integrated controller 300 reflects the control calculation result for the next PWM switching period (instead of the current PWM switching period in which the control calculations are completed) in order to control PWM switching. For example, in FIG. 2, there is a difference between the PWM switching periods before and after the control calculation is ended.

However, since the PWM switching period and the ADC period are different from each other, the start point of the ADC period does not coincide with the start point of the PWM switching period. Further, the timing therebetween changes over time. As a result, the control calculation result is changed, and the PWM switching period in which the control calculation result is applied is also changed. This change over time may reduce control precision.

FIG. 3 is a diagram illustrating an example in which ADC operations are consecutively performed without a margin during an ADC period. As illustrated in FIG. 3, the ADC operation time is not equal to the PWM switching period. Thus, when the ADC operations are consecutively performed during the ADC control period, the start point of the PWM switching period does not coincide with the start point of the ADC period. Further, the timing therebetween changes over time. Therefore, the control calculation result is changed, and the PWM switching period in which the control calculation result is applied is changed. This change over time may reduce control precision.

Figure 4:
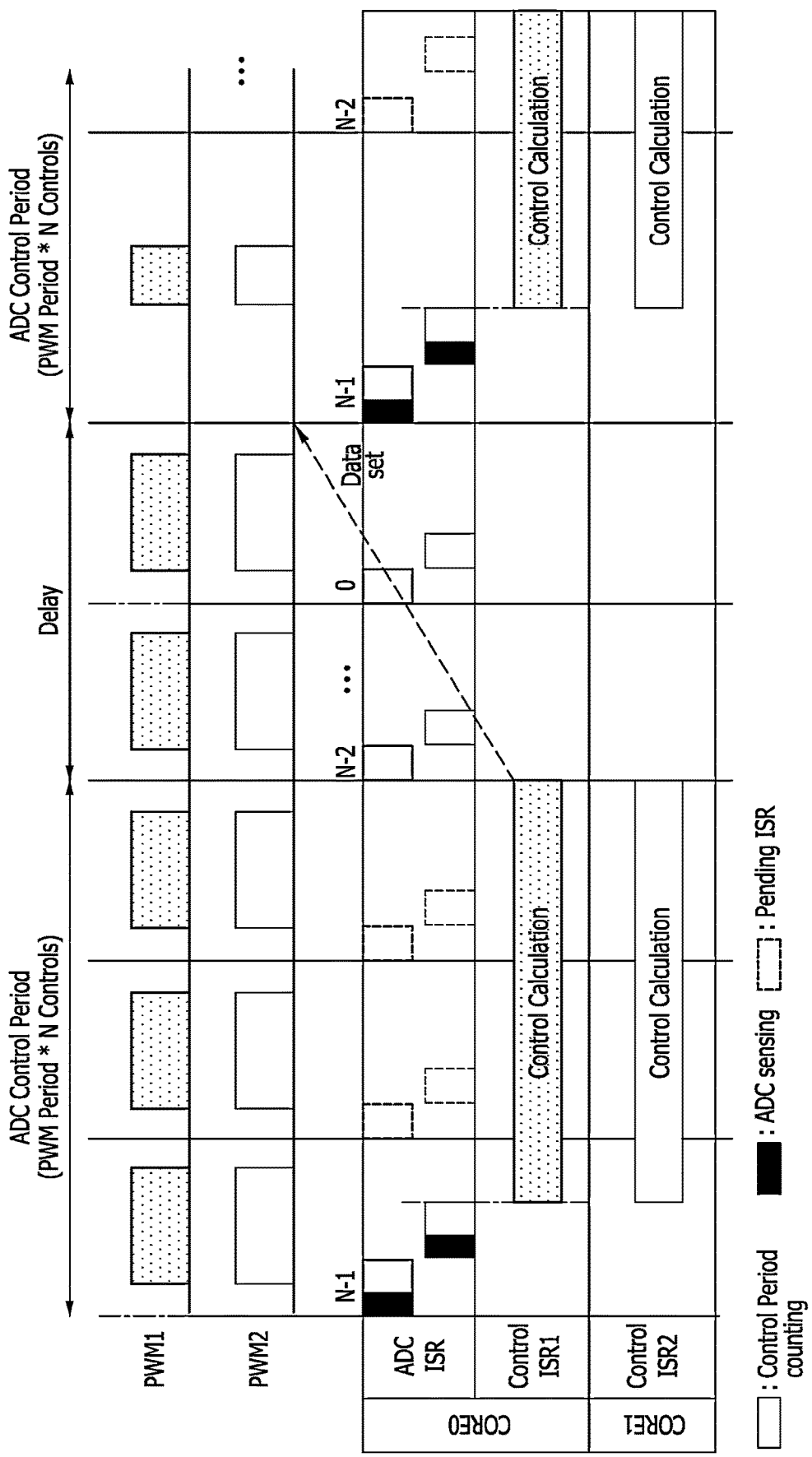
FIG. 4 show an example control method of a power converting system for a vehicle.
Figure 5:
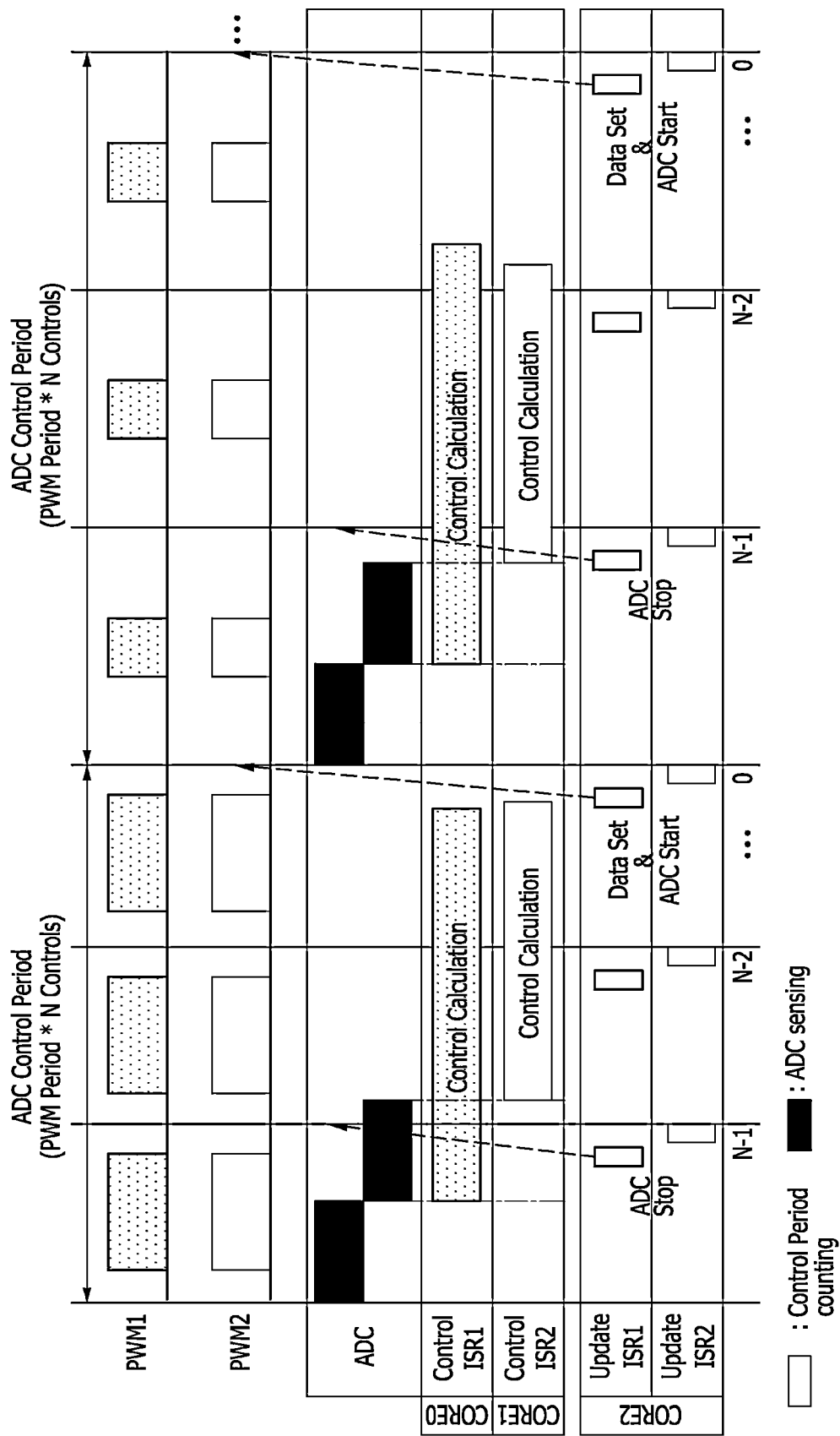
FIG. 5 shows a second example control method of a power converting system for a vehicle.

FIG. 4 shows an example control method for a power converting system for a vehicle. FIG. 5 shows a second example control method for a power converting system for a vehicle.

Referring to FIG. 4, the example method may be used to synchronize ADC operation and PWM switching frequency control operation. According to the example control method, the first core CORE0 of the OBC and LDC integrated controller 300 performs both on/off (start/stop) control (ADC ISR) for the ADC module (not illustrated) and the first control calculation (control ISR1). The second core CORE1 performs the second control calculation (control ISR2).

In order to synchronize the ADC operation and the PWM switching frequency control operation, the first core CORE0 counts a designated number (e.g., three or other predetermined number) of PWM switching periods, and then performs the ADC operation when the next PWM switching period starts.

At this time, since the first core CORE0 cannot perform the ADC operation control (ADC ISR) and the first control calculation (control ISR1) at the same time, the first core CORE0 performs the first control calculation (control ISR1) after performing (e.g., completely performing) the ADC operation control (ADC ISR). For example, the performance of the ADC operation control may include the first core CORE0 sequentially performing a second ADC operation on the first high-voltage DC-DC converter DCDC1 after performing a first ADC operation on the PFC 110.

Furthermore, since the first core CORE0 cannot necessarily control the ADC module (not illustrated) while performing the first control calculation (control ISR1), the count of the PWM switching periods is paused and then resumed in the next PWM switching period after the first control calculation (control ISR1) is completed.

That is, although the first control calculation (control ISR1) is completed, the result of the first control calculation (control ISR1) is not immediately applied in the next PWM switching period. Rather application is held until the count of the PWM switching periods is completed. The result of the first control calculation (control ISR1) is applied in the next PWM switching period after the count is resumed from the next PWM switching period after the completion of the first control calculation (control ISR1) and a designated number (e.g., three or other predetermined number) of PWM switching periods are counted.

Similarly, although the second control calculation (control ISR2) is completed, the result of the second control calculation (control ISR2) is not necessarily immediately applied in the next PWM switching period. Rather application may be held until the count of the PWM switching periods is completed. The result of the second control calculation (control ISR2) is applied in the next PWM switching period after the count is resumed from the next PWM switching period after the completion of the second control calculation (control ISR2) and a designated number (e.g., three or other predetermined number) of PWM switching periods are counted.

Therefore, the example control method of the power converting system for a vehicle in may be used to synchronize the ADC operation and the PWM switching frequency control operation. In various context that may allow for more precise control than available via existing control methods. This precision increase may be available even in case where the time required to apply the control calculation result increases.

Referring to FIG. 5, the second example control method for the power converting system for a vehicle may be used to synchronize the ADC operation and the PWM switching frequency control operation. The control method is different from the method described with reference to FIG. 4. For the second example method, OBC and LDC integrated controller 300 further includes at least a third core (CORE2) configured to perform on/off (or start/stop) control (Update ISR1) of the ADC module (not illustrated) and count (Update ISR2) the PWM switching periods.

When an ADC operation is started in a PWM switching period determined in accord with an ADC control period, the third core (CORE2) may stop ADC operation after one ADC operation is completed and simultaneously count a designated number (e.g., three or other predetermined number) of PWM switching periods. In some cases, the count may be performed regardless of whether the first and second control calculations (control ISR1 and control ISR2) are performed. Then, when the count is completed, the third core (CORE2) may output a designated command (e.g., Data Set & ADC start) and apply the results of the first and second control calculations (control ISR1 and control ISR2) in the next PWM switching period. The third core may start the ADC operation.

Figure 6:
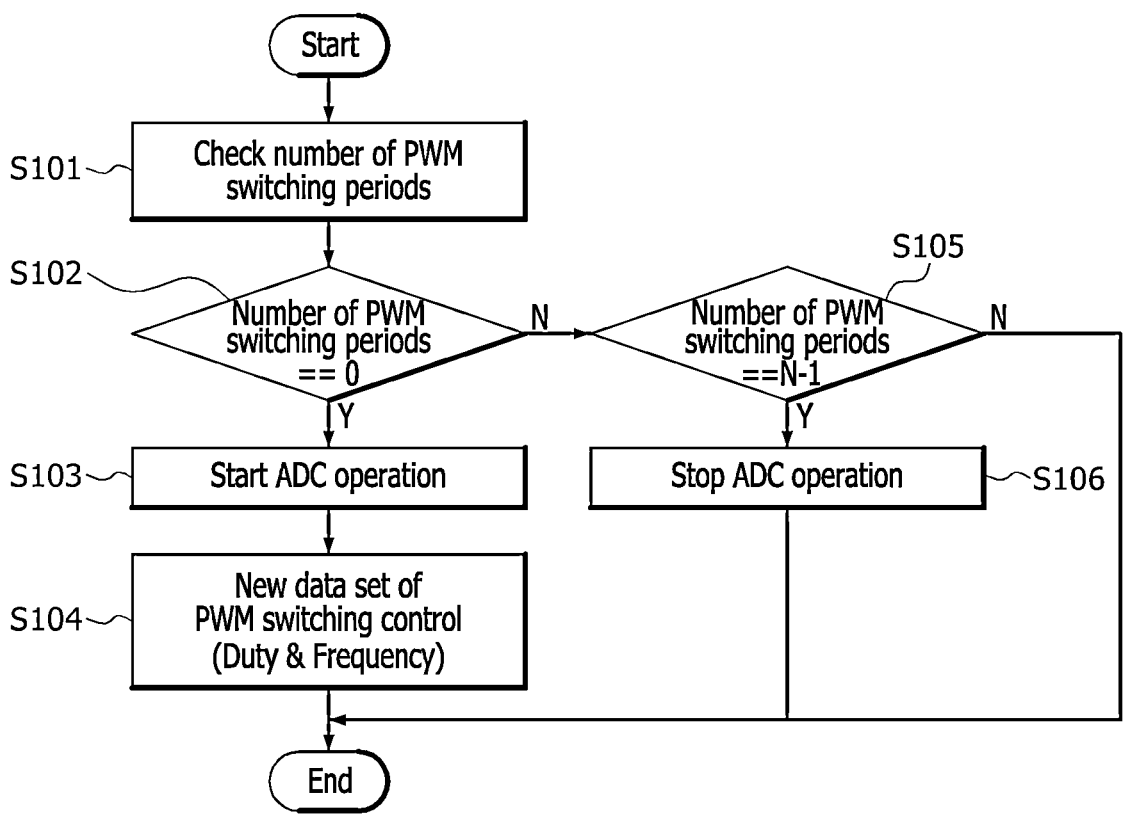
FIG. 6 is a flowchart showing an example ADC operation and an example PWM switching frequency control operation of an OBC and LDC integrated controller in FIG. 5.

FIG. 6 is a flowchart showing example ADC operation and PWM switching frequency control operation of the OBC and LDC integrated controller in FIG. 5.

Referring to FIG. 6, the OBC and LDC integrated controller 300 may check the number of PWM switching periods in step S101.

The number of PWM switching periods indicates a designated number (e.g., three or other predetermined number) of PWM switching periods, which are counted to synchronize the ADC operation and the PWM switching frequency control operation.

When the check result indicates that the number of PWM switching periods is 0 (Yes in step S102), e.g., when the designated number of PWM switching periods are counted, the OBC and LDC integrated controller 300 may turn on (starts) the ADC operation in step S103.

Thus, although not illustrated in detail in the drawing, the OBC and LDC integrated controller 300 may perform control calculation (or calculate a PWM switching frequency to acquire a target output voltage/current according to an input voltage/current) on the basis of the ADC operation result, and may apply the control calculation result (e.g., PWM switching duty and frequency as new data set of PWM switching control) in the next PWM switching period, in step S104.

When the check result indicates that the number of the PWM switching periods is N−1 (Yes in step S105), e.g., when a first PWM switching period among the designated number of PWM switching periods is counted, the OBC and LDC integrated controller 300 may turn off (stops) the subsequent ADC operation in step S106.

Furthermore, although not illustrated in detail in the drawing, the OBC and LDC integrated controller 300 may continually count the PWM switching periods e.g., repeatedly performing steps S101 to S106, in some cases.

In the example, the high-capacity OBC and the LDC, which are included in the power converting system for a vehicle, may be controlled by one integrated controller. Thus, the high-capacity OBC (e.g., the OBC for charging a high-voltage battery whose capacity and output voltage are increased) may be controlled through using a PWM method. Further, the volume and cost of the power converting system for a vehicle may be reduced.

Although the present disclosure has made reference to various illustrative examples, and those skilled in the art will appreciate that various modifications and other equivalents are possible. Furthermore, the example embodiments described in this specification may be implemented via a method or process, a device, a software program, a data stream or a signal, for example. Although a feature is discussed one or more example contexts (for example, discussed only in the context of a method), the discussed feature can be implemented in another type (for example, apparatus or program). An apparatus may be implemented in suitable hardware, software and/or firmware. Further, instructions for implementing the methods may be stored on a medium that is non-transitory and/or "other than a transitory signal." The method can be implemented in a device such as a processor which generally refers to a processing device including a computer, a microprocessor, an integrated circuit or a programmable logic device. The processor also includes a communication device, such as a computer, cellular phone, PDA (Personal Digital Assistant) and another device, which facilitates information communication between end users.

Although exemplary embodiments have been disclosed for illustrative purposes, those skilled in the art will appreciate that various modifications, additions and substitutions are possible, without departing from the scope and spirit of the disclosure.

What is claimed is:

1. A power converting system for a vehicle, comprising:
   an on board charger (OBC) configured to charge a high-voltage battery characterized by a capacity at least equal to a reference capacity;
   a low voltage DC-DC converter (LDC) configured to convert a high voltage of the high-voltage battery into a low voltage, and charge a low voltage battery; and
   an OBC and LDC integrated controller configured to perform integrated control on the OBC and the LDC,
   wherein the OBC and LDC integrated controller performs pulse width modulation (PWM) switching control by synchronizing an ADC operation and a PWM switching frequency control operation, and
   wherein the OBC and LDC integrated controller is configured to:
   count, after one ADC operation started in a PWM switching period determined according to an ADC control period is completed, a designated number of PWM switching periods to synchronize an ADC operation and a PWM switching frequency control operation, and
   perform a next ADC operation when a next PWM switching period is started.

2. The power converting system of claim 1, wherein the OBC includes a plurality of DC-DC converting circuits connected in parallel.

3. The power converting system of claim 2, wherein the OBC and LDC integrated controller comprises:
   a driver configured to control through a PWM method, internal switches of a power factor corrector (PFC), the plurality of DC-DC converting circuits, and internal switches of the LDC;
   an analog digital converter (ADC) module configured to convert a voltage value and a current value into digital values; and
   a control unit configured to control the driver and the ADC module.

4. The power converting system of claim 3, wherein the control unit comprises two or more cores.

5. The power converting system of claim 3, wherein when a first core of the OBC and LDC integrated controller is implemented to perform both on/off control of the ADC module and first control calculation and a second core of the OBC and LDC integrated controller is implemented to perform a second control calculation, the first core is configured to:
   count, after the one ADC operation started in the PWM switching period determined in accordance with the ADC control period is completed, the designated number of PWM switching periods to synchronize the ADC operation and the PWM switching frequency control operation,
   perform the next ADC operation when the next PWM switching period is started, and
   perform the first control calculation after completing a designated ADC operation control.

6. The power converting system of claim 5, wherein the first core is configured to pause the count of PWM switching periods while performing the first control calculation, resume the counting from the next PWM switching period after the first control calculation is completed, and apply the result value of the first control calculation in the next PWM switching period after the designated number of PWM switching periods are counted.

7. The power converting system of claim 6, wherein the OBC and LDC integrated controller further comprises a third core configured to perform on/off control of the ADC module and count PWM switching periods, wherein when the ADC operation is started in the PWM switching period determined according to the ADC control period, the third core is configured to stop the ADC operation after one ADC operation is completed, and simultaneously count a designated number of PWM switching periods regardless of whether the first and second control calculations are performed, output a designated command when the counting is completed, apply the results of the first and second control calculations in the next PWM switching period, and resume the ADC operation.

8. A control method of a power converting system for a vehicle, the control method comprising:
   checking, by an on-board charger (OBC) and low-voltage DC-DC converter (LDC) integrated controller, a number of pulse width modulation (PWM) switching periods;
   starting, by the OBC and LDC integrated controller, an analog-to-digital converter (ADC) operation when the check result indicates that the number of PWM switching periods are complete; and
   performing, by the OBC and LDC integrated controller, a designated control calculation based on the ADC operation and applying the control calculation result value in the next PWM switching period.

9. The control method of claim 8, wherein the number of PWM switching periods indicates a designated number of PWM switching periods, which are counted to synchronize the ADC operation and the PWM switching frequency control operation.

10. The control method of claim 8, wherein the control calculation includes calculation of a PWM switching frequency and duty to acquire a target output voltage/current according to an input voltage/current detected through the ADC operation.

11. The control method of claim 8, further including:
controlling, via a driver and through a PWM method, internal switches of a power factor corrector (PFC) and a plurality of high-voltage DC-DC converters connected in parallel, which are included in a high-capacity OBC, and internal switches of a low-voltage DC-DC converter included in an LDC;
converting, via an ADC module, a voltage value and a current value into digital values; and
controlling, via a control unit, the driver and the ADC module.

12. The control method of claim 11, wherein the control unit comprises two or more cores.

13. The control method of claim 11, wherein when a first core of the OBC and LDC integrated controller is implemented to perform on/off control of the ADC module and first control calculation and a second core of the OBC and LDC integrated controller is implemented to perform second control calculation:
counting, by the first core, a designated number of PWM switching periods to synchronize an ADC operation and a PWM switching frequency control operation;
performing, by the first core, an ADC operation when the next PWM switching period is started; and
performing, by the first core, the first control calculation after completing designated ADC operation control.

14. The control method of claim 13, further including:
pausing, by the first core, the count of the PWM switching periods while performing the first control calculation;
resuming, by the first core, the count from the next PWM switching period after the first control calculation is completed; and
applying the result value of the first control calculation in the next PWM switching period after the designated number of PWM switching periods are counted.

15. The control method of claim 13, wherein the OBC and LDC integrated controller further comprises a third core; and
where the control method further includes:
performing, by the third core, on/off control of the ADC module and count PWM switching periods, wherein when an ADC operation is started in a PWM switching period according to an ADC control period;
stopping, by the third core, the ADC operation after one ADC operation is completed, and simultaneously counting a designated number of PWM switching periods regardless of whether the first and second control calculations are completed;
outputting, the third core, a designated command when the count is completed;
applying, by the third core, the results of the first and second control calculations in the next PWM switching period; and
resuming, by the third core, the ADC operation.

16. A control method including:
pausing, for a power converting system, a count of a predetermined number of pulse width modulation (PWM) switching periods;
initiating a first analog-to-digital converter (ADC) operation of an ADC module of the power converting system, the first ADC operation applied to a power factor corrector of the power converting system;
performing a first control calculation of a PWM switching frequency for the power converting system;
initiating a second ADC operation of the ADC module, the second ADC operation applied to a high-voltage DC-DC converter of the power converting system;
performing a second control calculation of the PWM switching frequency for the power converting system;
resuming, in a next PWM switching period after the first control calculation is completed, the count of the predetermined number of pulse width modulation (PWM) switching periods; and
synchronizing operation of the ADC to the PWM switching frequency control, by applying a first result of the first control calculation to the PWM switching frequency at the start of a first PWM switching period after the count is completed.

17. The method of claim 16, wherein synchronizing operation of the ADC to the PWM switching frequency control further includes applying a second result of the second control calculation to the PWM switching at the start of the first PWM switching period after the count is completed.

18. The method of claim 16, wherein pausing the count includes pausing the count before initiating the first ADC operation.

19. The method of claim 16, wherein the predetermined number of PWM switching periods is three.

20. The method of claim 16, wherein:
performing the first control calculation includes obtaining a target voltage, a target current, or both; and
performing the second control calculation includes obtaining the target voltage, the target current, or both.

* * * * *